United States Patent [19]

Mojden

[11] 3,754,635

[45] Aug. 28, 1973

[54] CAN HANDLING APPARATUS

[75] Inventor: Wallace W. Mojden, Hinsdale, Ill.

[73] Assignee: Fleetwood Systems, Inc., Countryside, Ill.

[22] Filed: Jan. 7, 1972

[21] Appl. No.: 216,122

[52] U.S. Cl. ............................................... 198/41
[51] Int. Cl. ............................................ B65g 17/46
[58] Field of Search ........................ 198/41, 209, 25

[56] References Cited
UNITED STATES PATENTS

| | | | |
|---|---|---|---|
| 2,264,348 | 12/1941 | Weygant | 198/41 |
| 3,523,602 | 8/1970 | Mojden et al. | 198/41 |
| 3,447,663 | 6/1969 | Sarovich | 198/41 |
| 3,599,776 | 8/1971 | Momir Babunovic | 198/25 |
| 2,863,550 | 12/1958 | Hommel | 198/25 |

*Primary Examiner*—Richard E. Aegerter
*Assistant Examiner*—Joseph E. Valenza
*Attorney*—Roy H. Olson, Richard R. Trexler and Richard A. Giangiorgi et al.

[57] ABSTRACT

Disclosed is a can handling apparatus which has a first station for handling can bodies and which may include means for advancing the can bodies along a predetermined conveying path with the axis of the can bodies transverse to such conveying path. The cans are removed from the first conveying path by a rotating transfer wheel which has magnetic means at circumferentially spaced locations thereon. Each can is picked off from the conveying path and rotated about the transfer wheel and then removed by means of a stripper bar or blade so it can be deposited onto a second predetermined conveying path for further conveying of the can. Two or more of such transfer wheels may be utilized in any given can handling apparatus.

11 Claims, 7 Drawing Figures

Patented Aug. 28, 1973

Patented Aug. 28, 1973

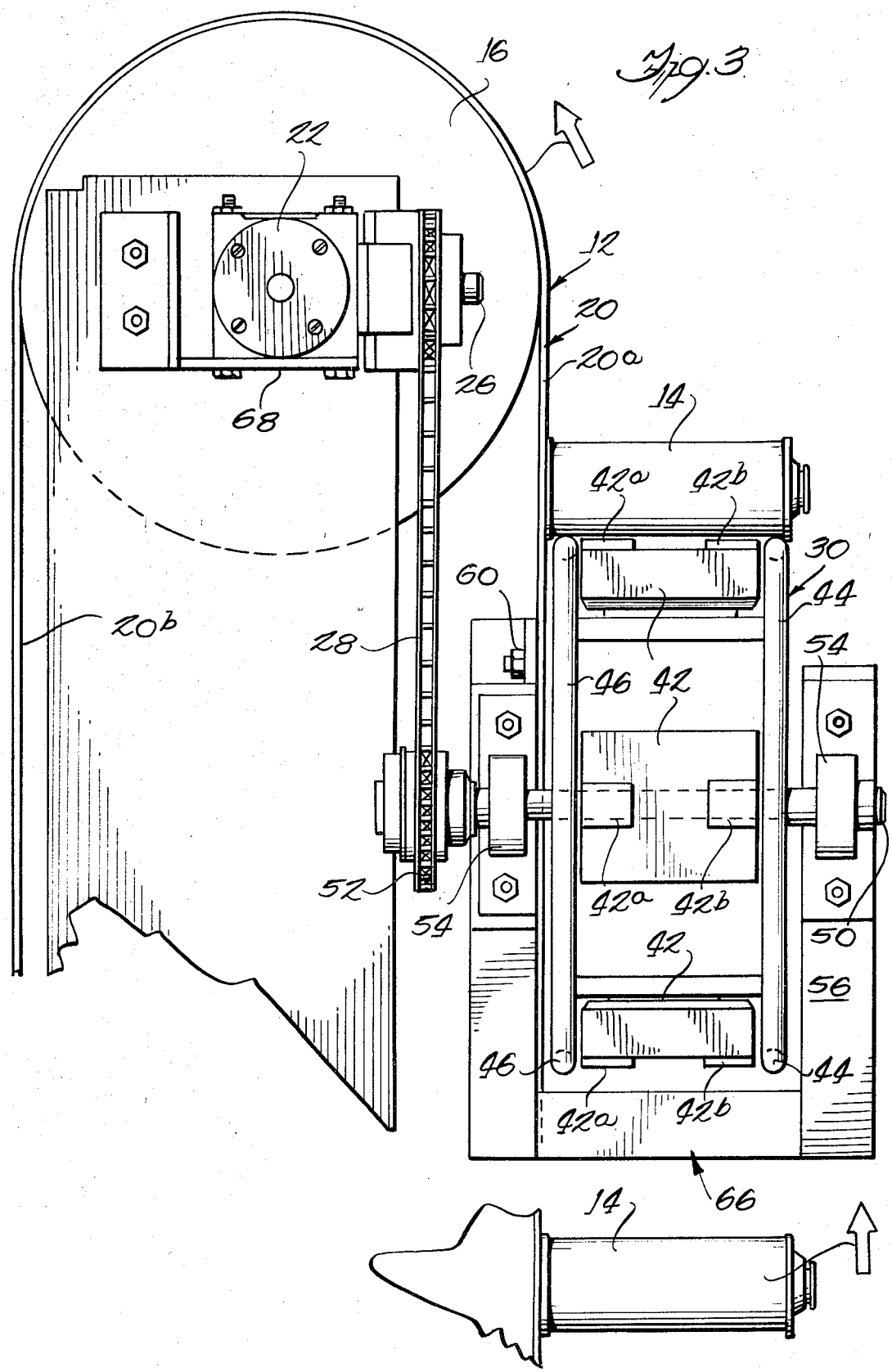

Patented Aug. 28, 1973 3,754,635
4 Sheets-Sheet 4
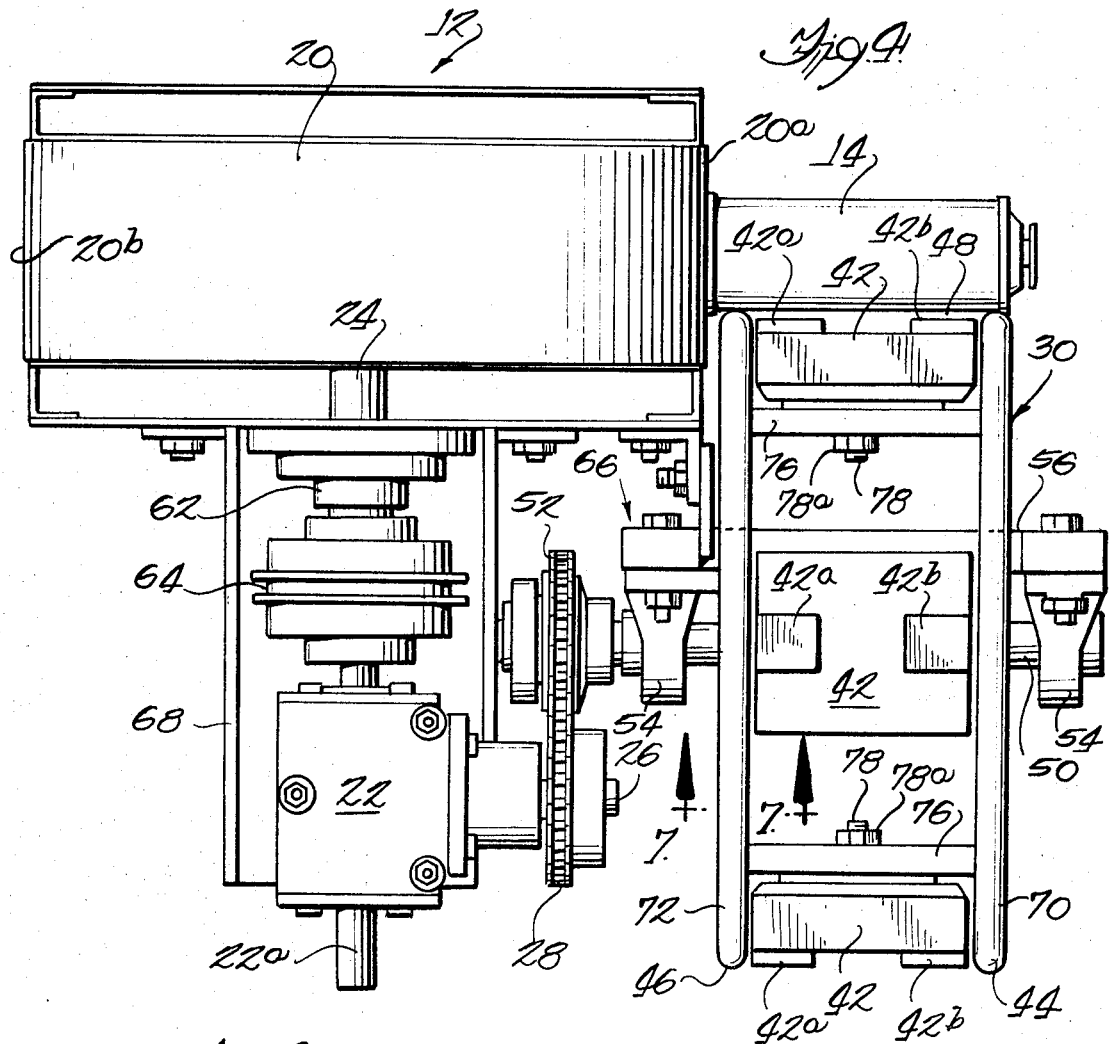
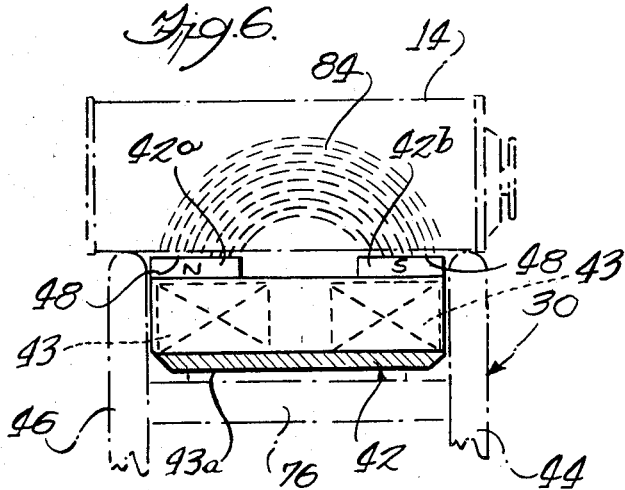
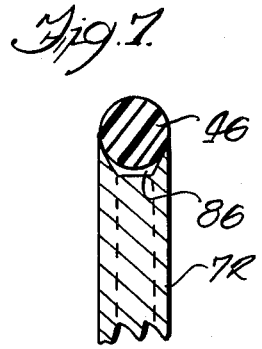

CAN HANDLING APPARATUS

BACKGROUND OF THE INVENTION

This invention relates to an apparatus for transporting articles and more particularly to apparatus for transferring metal cans or the like from one station to another station, the stations being either at different altitudes or at different horizontal locations.

Manufacturers of processed can products often utilize can bodies which have the product trade-dress applied thereto prior to filling, sealing, and packaging of the cans by the manufacturer. Application of this trade-dress is achieved primarily through a lithography process, however, certain problems arrive in this regard during the conveying of the can bodies from station-to-station during processing. More specifically, the filled or empty can bodies will be subjected to numerous bumps and shocks during conveyance which often dent the can bodies or materially mar the trade-dress. When this occurs, the cans are rendered unsuitable for sale.

Little or no problem is encountered so long as the cans are being conveyed along a linear path, be it horizontal or vertical. When it becomes necessary for the cans to undergo a change in direction, problems arise. The prior art methods of handling a change in direction along the conveying path was to employ guide rails at the turns or points where the cans were to be removed from the linear conveyor path. In this regard, the cans were forceably engaged against the guide rail thus enabling them to negotiate the conveyor curves or turns. In some instances the cans are allowed to accumulate at a turn with the back pressure created by the continuous stream of cans being delivered to this point causing the can bodies to be forced about the conveyor path turn. With both methods, the can bodies bump against each other and the guide rails causing damage to the lithographed trade-dress.

In addition, the above-described arrangements are unsatisfactory for handling relatively tall cans which may become unstable and have a tendency to tip over while being transported. This is even more likely to occur when the relatively tall cans contain a liquid which easily shifts within the can.

SUMMARY OF THE INVENTION

Accordingly, it is an object of this invention to provide an improved can handling apparatus for conveying metal cans or the like from one operating station to another operating station while effecting a change in direction without the possibility of the cans being tipped over, or the trade-dress being damaged.

Another object of this invention is to provide an improved can handling apparatus wherein the cans are positioned upon a traveling magnetic conveying belt at spaced apart locations and wherein the cans are picked off of the belt also at corresponding spaced apart locations, thereby eliminating bumping of one can against the next.

It is a still further object of this invention to provide an improved can handling apparatus wherein the cans are conveyed along a predetermined path and then have the direction of travel thereof changed without causing the cans to bump into guide or stop rails or the like or bump into one another.

Yet another object of this invention is to provide an improved can handling apparatus wherein the magnetic conveyor belt arrangement is provided for transporting the can bodies vertically from a lower operating station to a higher operating station and wherein the cans are picked off of the vertical conveyor by a transfer means which maintains the proper spacing between cans.

A feature of this invention is the use of a transfer wheel which has the axis of rotation thereof extending substantially parallel to the axis of the can bodies and wherein the can bodies are picked off the conveying path onto the transfer wheel with the can bodies extending across the circumference of the transfer wheel. In addition, the transfer wheel includes at least a pair of spaced resilient rings or bands positioned to keep the can bodies from engaging the metal portions of the wheel, which might scratch the lithographed trade-dress.

Briefly, the can handling apparatus of this invention includes a first can handling station which is here a vertical magnetic conveying belt for transporting the cans along a predetermined conveying path. At the upper end of the vertical conveying belt is located a transfer wheel which has magnetic means located at spaced points along the circumference of the wheel. Each of the magnetic means is located circumferentially from the adjacent means a distance corresponding substantially to the linear spacings of the cans on the vertical magnetic belt. As each can approaches the circumference of the magnetic transfer wheel, its appropriate magnetic means is being rotated into position and will cause the can magnetically to be transferred from the vertical conveyor belt to the rotating transfer wheel. The can body is then transported along the circumference of the transfer wheel through a predetermined arc segment, which may be on the order of 90° to 300°, more or less, and then the can is picked off of the transfer wheel by means of a pick-off blade which is positioned in close proximity to the circumference of the transfer wheel. The pick-off blade comes between the can surface and the circumference of the transfer wheel and causes the can to be removed. The can bodies are then transported along a second conveying path, this second conveying path being either magnetic or non-magnetic as desired. Furthermore, a second transfer wheel may be incorporated at the downstream side of the vertical magnetic conveyor so that can bodies are positioned on the vertical conveyor at the appropriate spacings, these spacings corresponding substantially to the spacings of the magnetic means of the upper transfer wheel.

Accordingly, other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 3 is a side view of the upper end seen in FIG. 2;

FIG. 4 is a top view of the upper end shown in FIG. 2;

FIG. 5 is an enlarged sectional view of the transfer wheel shown at the upper end of the apparatus of FIG. 1;

FIG. 6 illustrates the magnetic flux path of the magnetic pole members of the transfer wheel; and FIG. 7 is a sectional view taken on line 7—7 of FIG. 4 illustrating the resilient ring about the circumference of the transfer wheel for cushioning the can bodies as they engage and leave the transfer wheel.

DETAILED DESCRIPTION OF THE ILLUSTRATED EMBODIMENT

Figure 1:
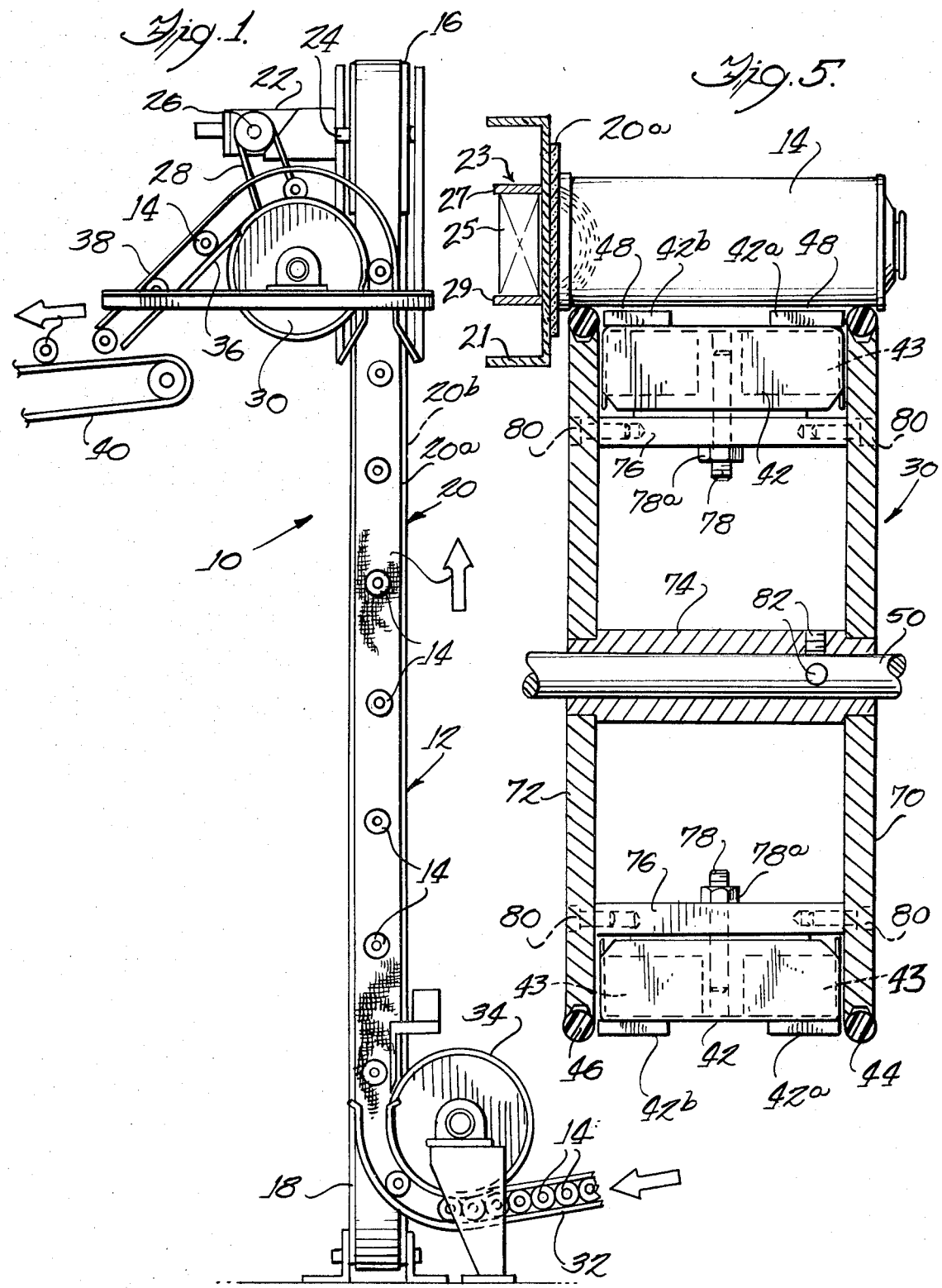
FIG. 1 is a frontal view of a can handling apparatus constructed in accordance with the principles of this invention and shows a vertical magnetic conveying belt for raising can bodies to a different altitude and further shows a transfer wheel at the top of the conveying belt for changing the direction of travel of the can bodies and a second transfer wheel at the bottom of the conveying belt for placing can bodies on the conveying belt at predetermined spaced locations.

Referring now to FIG. 1, a can handling apparatus is designated generally by reference numeral 10 and is constructed in accordance with the principles of this invention. The apparatus 10 includes a magnetic vertical conveyor 12 which receives a plurality of spaced can bodies 14, which are here viewed from the upper end thereof. The can bodies 14 are placed on the conveyor 12 and transported along a predetermined path upwardly whereupon the can bodies have their direction of travel altered in accordance with this invention.

The conveyor 12 is formed of upper and lower pulley wheels 16 and 18, respectively, with a continuous web or belt 20 engaged over said wheels. The web 20 has the active run 20a thereof receiving the can bodies while the return run travels from the pulley 16 to the pulley 18 free of cans. The pulley wheel 16 is driven by a drive motor 22 which has one output shaft thereof direct coupled to the pulley wheel 16 for rotating the same and a second output shaft 26, at right angles to the drive motor 22, and is connected by means of a drive chain to a transfer wheel 30 located at the top end of the vertical conveyor 12. As such, the motor 22 will run the conveyor 12 and transfer wheel 30 in synchronization.

The conveyor 12 is preferably of the magnetic type, one construction of which is illustrated in U. S. Pat. No. 3,523,602. As can be seen in the upper left hand portion of FIG. 5, the active run or reach 20a of the belt 20 overlies a non-magnetic housing 21 disposed intermediate said reach and a magnetic arrangement 23 disposed beneath said housing. The magnetic arrangement 23 will extend for the major length of the conveyor 12 and establish a magnetic field along the length of said conveyor which attracts and maintains the can bodies in a proper upright position relative to the active web reach 20a. While the construction of the magnetic arrangement may vary, a preferred embodiment is shown in FIG. 5. In this regard, a ceramic magnetic member 25 is employed in conjunction with a pair of elongate metal pole plates 27 and 29 disposed at the opposite side of said member 25. The pole plates 27 and 29 function as north and south poles, respectively, and serve to focus the magnetic flux of the field created by the magnetic arrangement 23.

The transfer wheel 30 has a plurality of spaced apart permanent magnet assemblies along the circumference thereof and these magnet assemblies are of sufficient strength to attract the can bodies 14 from the web 20 and cause them to remain in engagement with the periphery of the driven transfer wheel 30. The spacing of the permanent magnet assemblies along the periphery of the transfer wheel 30 is substantially that of the spacing of the can bodies moving along the belt 20 so that a single can body is picked off by each magnet as the conveying belt passes.

To provide uniform spacing of the can bodies where desired, a plurality of closely spaced cans travel along a downwardly inclined chute 32 and the cans are positioned onto the lower end of the conveyor 12 by a similarly fashioned transfer wheel 34. That is, the transfer wheel 34 has spaced apart magnets along the periphery thereof which spacing corresponds substantially to the spacing of the magnets of the transfer wheel 30. Furthermore, synchronizing means may be incorporated so that the transfer wheel 34 places the can bodies onto the vertical magnetic belt 20 so it will arrive at the upper end thereof substantially simultaneously as a magnetic member of the transfer wheel 30 moves into position to pick off or attract a can by magnetic force.

Once the can body 14 is magnetically fastened to or engaged with the transfer wheel 30, it rotates with the wheel through a predetermined arc segment until the can reaches a pick-off blade 36 which has a thin leading edge thereof in close proximity to the circumference of the transfer wheel. The can body and transfer wheel are parted as the can passes over the pick-off blade. The can then rolls down a chute 38 and onto a substantially horizontal conveyor 40, which may be of the magnetic or non-magnetic type, as desired.

Figure 2:
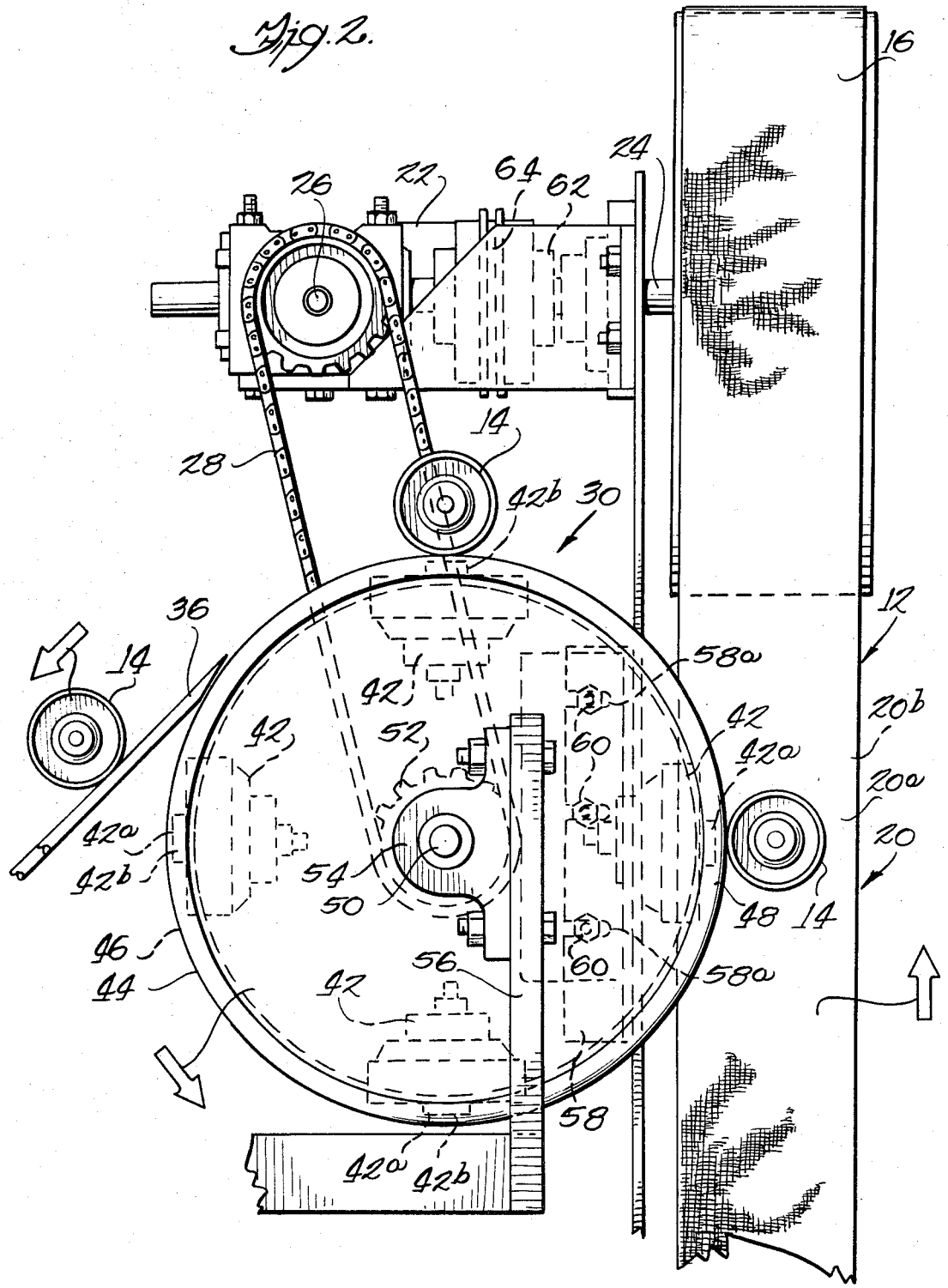
FIG. 2 is an enlarged fragmentary view of the upper end of the can handling apparatus of FIG. 1 showing more clearly the details of construction.

Referring now to FIG. 2, the transfer wheel 30 is seen having four equally spaced apart magnetic assemblies 42, preferably each including a pair of rectangular ceramic magnet members 43 joined by a shunt plate 43a. The magnet assemblies 42 each have a pair of spaced apart pole pieces 42a and 42b which are respective North and South poles, and tend to focus the magnetic flux or forces established by each magnet member 43. These pole plates extend from the upper flat surface of the magnet member 43 a distance sufficient to come in close proximity to the circumference of the transfer wheel but still being slightly spaced therefrom. A pair of resilient rings 44 and 46 are positioned about the circumferential edges of the transfer wheel and on each side of the permanent magnet assemblies 42. As a can body is attracted to the wheel 30 by the magnetic flux from the corresponding magnets, the resilient rings 44 and 46 maintain the can body slightly spaced from the pole pieces as indicated by reference numeral 48. Therefore, printed matter on the can body is not scratched or otherwise damaged by contact with the iron pole pieces, or other segments of said wheel.

The transfer wheel 30 rotates about a shaft 50 which, in turn, is connected to a gear 52 for engagement with the chain drive 28. The shaft 50 is journalled by a pair of support bearings 54 bolted to a suitable support frame 56. An adjusting plate 58 is provided for horizontally adjusting the position of the transfer wheel so that its peripheral edge comes into close proximity with the position of the can body as they move along the vertical conveying belt 20. This adjustment is provided by a plurality of bolts 60 which extend through elongated slots 58a of the plate 58.

The drive motor 22 may include a flexible coupling 62 so that slight error in alignment is readily compensated for. Also, a suitable clutch arrangement 64 may be included, the clutch being either electrically or mechanically operated, so that the vertical conveyor can be engaged or disengaged from transport operation while the transfer wheel is maintained rotating.

Referring now to FIG. 3, still further details of construction are illustrated. Hence the support frame 56 is shown as part of a larger U-shaped frame structure fabricated to receive and support the shaft 50. The other support bearing 54 is located on the other side of the transfer wheel 30 for journalling the same. The drive motor 22 is supported on a suitable plate structure 68 which is fabricated of any suitable sheet metal components and can take any form as desired, so long as the spacing of the output shaft 26 and the shaft 50 are maintained relatively constant, the drive chain 28 will not leave the drive gears. Also, a suitable clutch arrangement may be incorporated between the outward shaft 26 and the gear 52 of the transfer wheel 30 so that the transfer wheel can be disengaged while the vertical conveyor belt 20 continues operation.

Referring now to FIG. 4, a top view of the vertical conveyor 12 and the transfer wheel 30 is shown. Here it is clearly seen that the bearing supports 54 are located outboard the transfer wheel and supported by the U-shaped frame 66. The drive motor 22 is shown having an auxiliary output shaft 22a extending to the rear of the motor and can be used to drive other auxiliary conveyor means. Furthermore, the drive motor 22 can be replaced by a gear reduction unit and the output shaft 22a is then considered the input shaft to the gear reduction unit and driven by any suitable motor means. While the permanent magnet assemblies 42 are here shown as employing rectangular ceramic magnets units 43, it will be understood that these permanent magnets can take any configuration either round, square, or rectangular as shown. Furthermore, they may be formed of materials other than ceramic, as for example, soft iron, permanent magnet, or electromagnets, or the like. The permanent magnet assemblies 42 are secured to the transfer wheel 30 by connection to a transverse support plate 76 with a bolt 78 and a nut 78a, and the support plates 76 are fastened to end walls 70 and 72 of the transfer wheel 30 by means of a plurality of recessed bolts 80. The transfer wheel assembly 30 is fastened to the shaft 50 by means of a pair of set screws 82, it being understood that other suitable fastening means can be incorporated.

Referring now to FIG. 6, a more detailed showing is made of the magnetic assemblies 42 which magnetically attract the can housing 14 to the periphery of the transfer wheel 30. Here the space 48 is clearly seen as being maintained between the pole pieces 42a and 42b and the surface of the can 14. The spacing may vary depending on the resiliency of the resilient rings 44 and 46, softer rings causing the magnetic force to attract the can closer to the pole pieces while harder rings will cause the can to be attracted less toward the pole pieces. The magnetic flux is indicated by a series of dashed lines indicated by reference numeral 84 and passes from one pole piece, through the can skin, into the other pole piece. Although the flux lines 84 are shown in an arcuate fashion, it will be understood that the primary flux path is through the skin of the can rather than through the air space within the can.

FIG. 7 clearly illustrates the construction of one end wall 72 of the transfer wheel 30. The end wall 72, as well as the end wall 70, is provided with an annular groove extending about the entire circumference thereof to receive the resilient ring 46 therein. This ring is sufficiently soft to prevent inadvertent scratching or marking of the can surface so as to protect any printed matter thereon.

What has been described is a simple and efficient can handling apparatus which applies can housings to a vertical conveyor belt at spaced intervals and which picks off the can housings from the vertical conveyor belt at correspondingly spaced intervals to change the direction of the travel of the cans. While only a specific embodiment is shown herein, it will be understood that variations and modifications of this invention may be effected without departing from the spirit and scope of the novel concepts disclosed and claimed herein.

The invention is claimed as follows:

1. Can handling apparatus comprising: a magnetic conveyor including endless belt means and magnetic means for maintaining can bodies in engagement with the active run of said belt means; a magnetic transfer wheel rotatably mounted adjacent and overlying a selected location along said active run to remove said can bodies from said belt, the axis of said wheel being laterally spaced from the axis of said belt means and disposed generally perpendicular to the active run of said belt means, said transfer wheel including a plurality of magnetic assemblies disposed about the circumference thereof at circumferentially spaced locations, each said magnetic assembly including a magnetic arrangement and a pair of spaced pole pieces magnetically engaged therewith to provide said pole pieces with opposite polarities, and at least two, spaced resilient ring members positioned about the circumference of said wheel on opposite sides of said magnetic assemblies and defining the outer extremities of said transfer wheel, said magnetic assemblies being disposed radially inward of said resilient ring members such that can bodies will be attracted to and engaged with said transfer wheel while physically contacting only said resilient ring members to protect the surface of said can bodies from damaging contact with the remainder of said transfer wheel.

2. Can handling apparatus as defined in claim 1 wherein each said magnetic arrangement is a permanent magnet formed of a ceramic material.

3. The can handling apparatus of claim 1 wherein said spaced locations are four in number.

4. The can handling apparatus of claim 1 wherein said transfer wheel is formed by a rotatable shaft, parallel end plates secured to said shaft for rotation therewith, with grooves formed in the circumference of each of said end plates, said resilient ring members positioned in said grooves to provide a resilient surface against which each can body is urged against by magnetic force, and said magnet assemblies being positioned between said end plates at each of said spaced locations.

5. The can handling apparatus of claim 1 further including stripper bar means positioned adjacent the circumference of said transfer wheel to cause the can bodies to be removed from the transfer wheel and directed to a second station for handling can bodies.

6. Can handling apparatus for conveying can bodies from a first station to a second station while maintaining a desired degree of spacing between said can bodies, said apparatus comprising: a magnetic conveyor including endless belt means and magnetic means disposed beneath the active run of said belt means for maintaining can bodies in engagement therewith; a first transfer wheel rotatably mounted adjacent and overlying a first selected location along the active run of said belt means, the axis of said first transfer wheel being laterally spaced from the axis of said belt means and disposed generally perpendicular to said active run, said first transfer wheel including a plurality of circumferentially spaced magnetic assemblies; supply means operatively positioned adjacent said first transfer wheel for supplying can bodies thereto, such that can bodies will be attracted to and engaged with said first transfer wheel at circumferentially spaced locations; and means operatively associated with said first transfer wheel for disengaging said can bodies therefrom to thereby dispose said bodies on said magnetic conveyor in spaced relation corresponding to the circumferential spacing of said magnetic assemblies; a second transfer wheel rotatably mounted adjacent and overlying a second selected location along said active run of the belt means, the axis of said second wheel being laterally spaced from the axis of said belt means and disposed generally perpendicular to said active run, said second transfer wheel including a plurality of circumferentially spaced magnetic assemblies corresponding in number and spacing to those of said first transfer wheel, such that said second transfer wheel will magnetically attract and remove can bodies from said conveying means upon said bodies reaching said second location, while maintaining the desired spacing between said can bodies; and means for removing said can bodies from said second transfer wheel.

7. Can handling apparatus as defined in claim 6, wherein each transfer wheel includes at least two spaced resilient ring members positioned about the circumference of the wheel on opposite sides of said magnetic assemblies and defining the outer extremities of said wheel, such that can bodies will be attracted to and engaged with said transfer wheels while physically contacting only said resilient ring members.

8. Can handling apparatus as defined in claim 7, wherein each said magnetic assembly includes a magnetic arrangement and a pair of spaced pole pieces magnetically engaged therewith to provide said pole pieces with opposite polarities.

9. The can handling apparatus of claim 6 wherein each said magnetic assembly is formed of a permanent magnet and include spaced apart pole pieces with opposite polarities said pole pieces being sufficiently narrow only to attract a single can.

10. The can handling apparatus of claim 6, wherein at least one of said transfer wheels is formed by a rotatable shaft, parallel and plates secured to said shaft for rotation therewith, with grooves formed in the circumference of each of said end plates, said resilient ring members being positioned in said grooves to provide a resilient surface against which each can body is urged against by magnetic force, and said magnet assemblies being positioned between said end plates at each of said spaced points.

11. The can handling apparatus of claim 10 wherein said magnetic assemblies each include a pair of spaced apart pole pieces, each pole piece being adjacent the respective end plates and wherein the can body is attracted to the associated transfer wheel to rest upon the resilient rings while maintaining a minimum space between said pole pieces and said can body.

* * * * *